(12) United States Patent
Korn

(10) Patent No.: US 7,202,965 B2
(45) Date of Patent: Apr. 10, 2007

(54) METHOD OF USING PRINTED FORMS TO TRANSMIT THE INFORMATION NECESSARY TO CREATE ELECTRONIC FORMS

(76) Inventor: Stanley Korn, 1300 Army Navy Dr., Apt. 1015, Arlington, VA (US) 22202

( * ) Notice: Subject to any disclaimer, the term of this patent is extended or adjusted under 35 U.S.C. 154(b) by 784 days.

(21) Appl. No.: 10/196,404

(22) Filed: Jul. 16, 2002

(65) Prior Publication Data
US 2005/0275893 A1    Dec. 15, 2005

(51) Int. Cl.
*G06F 3/12*      (2006.01)
*G06K 15/00*   (2006.01)

(52) U.S. Cl. .................................... 358/1.15; 358/1.18
(58) Field of Classification Search ......... 358/1.1–1.18
See application file for complete search history.

(56) References Cited
U.S. PATENT DOCUMENTS

| | | | |
|---|---|---|---|
| 4,796,997 A | 1/1989 | Svetkoff et al. | |
| 5,532,845 A | 7/1996 | Gusmano | |
| 5,629,499 A * | 5/1997 | Flickinger et al. | 178/18.01 |
| 5,828,771 A | 10/1998 | Bloomberg | |
| 5,877,963 A | 3/1999 | Leung et al. | |
| 6,005,680 A | 12/1999 | Luther et al. | |
| RE36,560 E | 2/2000 | Svetkoff et al. | |
| 6,175,841 B1 | 1/2001 | Loiacono | |
| 6,181,441 B1 | 1/2001 | Walsh | |
| 6,278,979 B1 * | 8/2001 | Williams | 705/14 |
| 2002/0065951 A1 * | 5/2002 | Girardi et al. | |

* cited by examiner

*Primary Examiner*—Douglas Q. Tran
(74) *Attorney, Agent, or Firm*—John D. Gugliotta (57) ABSTRACT

A method is provided by which the information necessary to create an electronic form can be transmitted via a printed form. The formatting information necessary to recreate the electronic form is encoded in a symbology on the printed form in a space reserved for that purpose.

2 Claims, 8 Drawing Sheets

METHOD OF USING PRINTED FORMS TO TRANSMIT THE INFORMATION NECESSARY TO CREATE ELECTRONIC FORMS

RELATED APPLICATIONS

There are no previously filed, nor currently any co-pending applications, anywhere in the world.

BACKGROUND OF THE INVENTION

1. Field of the Invention

The present invention relates generally to computer generated paper forms and, more particularly, to a program and a method by which information can be encoded on a printed form such as to allow the information to be inserted into an electronic form, with the information placed in the corresponding field of the form through the use of a visually encoded image.

2. Description of the Related Art

Software packages exist that enable information to be input into a database via custom-designed electronic forms. Such a procedure could be used by an information collector (IC) to collect information from information providers (IPs) by having the latter fill out electronic forms on the Internet. For example, a company could make its employment application forms available in electronic form for applicants to fill out online. A limitation of this method is that it requires the IC to maintain an online presence, and can only be used by those IPs with computers and access to the Internet; the remaining IPs must use printed forms which must also be provided by the IC. The present invention overcomes this limitation by enabling IPs to use electronic forms without requiring the IC to maintain an online presence.

A search of the prior art did not disclose any patents that read directly on the claims of the instant invention; however, the following references were considered related.

The following patents disclose a method and apparatus for capturing a document image:

U.S. Pat. No. 6,005,680, issued in the name of Luther et al; and

U.S. Pat. No. 5,877,963, issued in the name of Leung et al.

The following patents describe the method and system for high-speed, high resolution, 3-D imaging of an object at a vision station:

U.S. Pat. No. 4,796,997, issued in the name of Svetkoff et al.; and

U.S. Pat. No. RE 36,560, issued in the name of Svetkoff et al.

U.S. Pat. No. 6,181,441, issued in the name of Walsh, discloses a multi-scanning system and method for stitching overlapped image data by varying stitch locations.

U.S. Pat. No. 6,175,841, issued in the name of Loaicono, describes a computerized system for producing on-line instructional materials.

U.S. Pat. No. 5,828,771, issued in the name of Bloomberg, discloses a method and article of manufacturing for determining whether a scanned image is an original or fax image.

And, U.S. Pat. No. 5,532,845, issued in the name of Gusmano, describes a high speed resolution platen screening system using a plurality of scanning units.

Consequently, there is a need for software program, and a method, by which information can be transmitted and encoded to be inserted onto a printed form, with the information placed in the corresponding field of the form.

SUMMARY OF THE INVENTION

It is therefore an object of the present invention to provide an improved method of inputting information into a database via custom-designed printed forms.

It is a feature of the present invention to provide an improved program and a method by which information can be transmitted and encoded to be inserted onto a printed form, with the information placed in the corresponding fields of the form.

Briefly described according to one embodiment of the present invention, a Form Management System (FMS) is provided in two versions. The IC version enables ICs to design forms and distribute printed versions of those forms to IPs so that the IPs can, with the aid of the IP version of the FMS, convert the printed forms into electronic forms.

An advantage of the present invention is that it is capable of using any form that is needed for information processing.

Another advantage of the present invention is that it includes encoded location of fields sent along with data for entry on the form.

Yet another advantage of the present invention is that it anticipates the use of a graphic user interface (GUI) to allow for easy and convenient for use among multiple platform application.

Finally, the use of the present software based method is adaptable to virtually any printed forms and allows for electronic data exchange with no paper.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 7-A is a block diagram of a form file containing a plurality of label fields and response fields;

FIG. 7-B is a block diagram of a form file containing a Field Format Block, which is an encoded area that houses the location and formatting information of the entire form file previously created;

FIG. 7-C is a block diagram of a form file that has been decoded to a viewable file to receive data entry from an information provider;

FIG. 7-D is a block diagram of a form file in which the response field is receiving an extended quantity of information, resulting in an expansion of the response field length and size, and having the corresponding effect of altering the location of subsequent label and response fields.

DESCRIPTION OF THE PREFERRED EMBODIMENTS

1. General Description of the Invention

Figure 1:
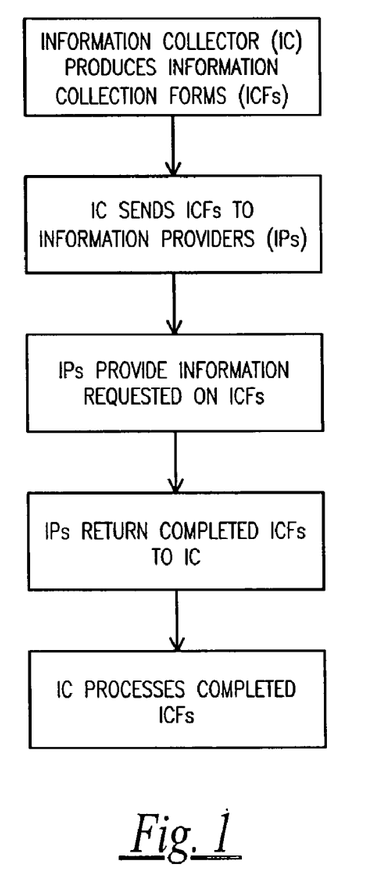
FIG. 1 is an overall process flow diagram for the method of the present invention.
Figure 2:
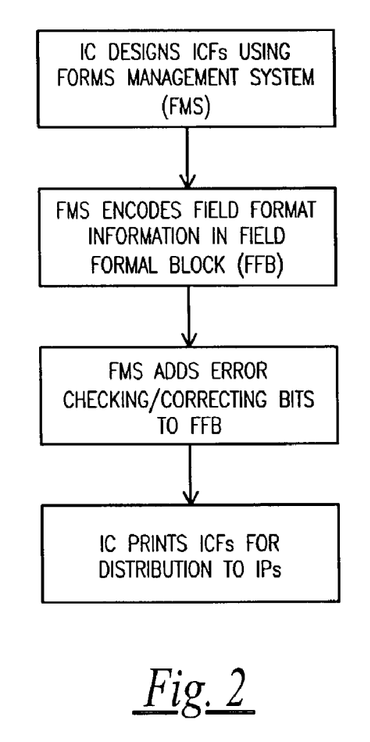
FIG. 2 is a flow diagram for the IC's form production process.

The overall process involved in the use of the Form Management System (FMS), shown in FIG. 1-4, begins when the IC uses the FMS (IC version) to design information collection forms (ICFs) (FIG. 2). The FMS differs from conventional form design software packages by virtue of the fact that it encodes the formatting information of each field on the form into a one inch square symbology referred to as the Field Format Block (FFB) printed in a reserved space in the upper right corner of the form. The FFB consists of an array of tiny squares, each of which may be either black or white and thereby encodes one bit of formatting information. Almost all printers and scanners today have sufficient resolution to accommodate the use of 0.01 inch squares to encode the formatting bits, which would allow the FFB to encode 10K bits of formatting information on each page of the form, which should be sufficient for even the most complex forms; however, the FMS would also have the capability of using larger, say 0.02 inch, squares to encode the bits if, for example, the forms are to be transmitted using a low resolution fax machine.

Figure 8:
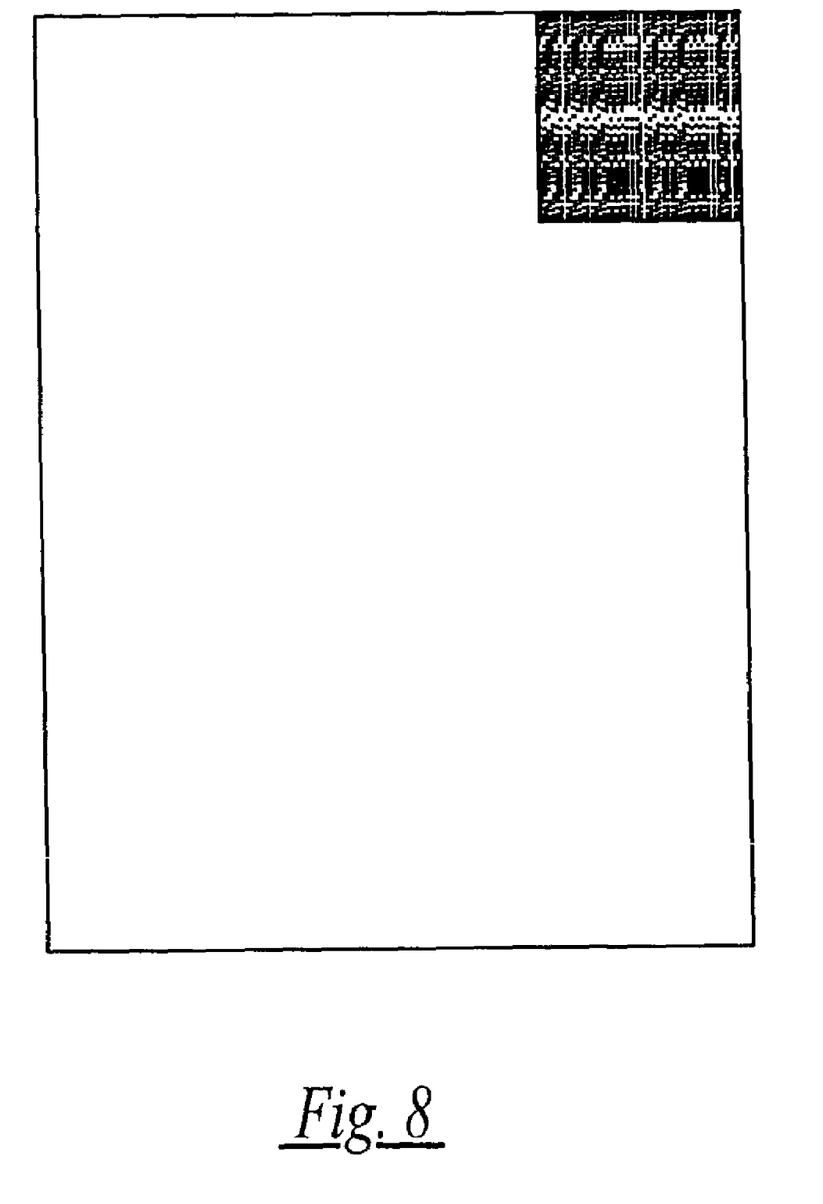
FIG. 8 is a graphical representation of a typical Field Format Block according to the present invention.

FIG. 8 shows a sample field FFB normally, the remainder of the page would be filled with the printed text of the form.

The IC may distribute the ICFs to the IPs by either mail of fax. When an IP who has a computer on which the FMS (IP version) resides receives an ICF produced by the FMS (which will be apparent by the presence of the FFB in the upper right corner of the form), he launches the FMS and scans the ICF as directed by the FMS. The FMS then combines the formatting information encoded in the FFB with the text printed on the remainder of the form to produce an electronic version of the form on the screen, which the IP then fills out on the computer. When the completed form is printed, the FFB contains any modifications in format resulting from completing the form. Those IPs who do not have the FMS can fill out the form by hand printing.

When the IC has received back all of the ICFs, he launches the FMS (IC version) and scans in all of the forms as directed by the FMS. Those forms that had been filled out using the FMS, recognizable by a bit switch set in the FFB, are scanned into the database set up to collect the information from the forms. Any forms filled out by hand printing are set aside for manual keying into the database.

The FMS (IC version) is similar to a conventional database management system with form design capability in that it allows an IC to custom design forms, either printed or electronic, in order to collect information to fill the custom-designed database. Unlike any existing software packages, the FMS (IC version) has the added capability of encoding the form's formatting information onto a symbology on the printed form so that the electronic version of the form can be recreated from the printed version of the form.

When an IC designs a form, he must specify for each field that appears on the form the location of that field on the form, the type of field, and certain other characteristics of the field such as the font size and style; this information is collectively referred to as the field formatting information, and is encoded in FFB located in the upper right corner on the first page of the printed form. (For multipage forms, FFBs may be printed on subsequent pages if necessary to encode all of the formatting information.)

The type of formatting information that needs to be specified depends on the field type. The starting position of the field on the page and the font characteristics must be specified for all text fields. The font characteristics include the font size, type (e.g., Times New Roman), style (e.g., bold), and color. For fixed-length fields, the field length needs to be specified; for variable length fields, both a default length and a maximum length are required. For a field residing on a single line, the length is given in characters, whereas the length of a multiline field is specified in terms of number of lines. For a graphic, the dimensions and location of the rectangular area containing the graphic need to be specified.

There are three main types of fields. The first type is a label field. A label field is a block of text or a graphic that appears on a "blank" form, and is used to specify the type of information that the IP is to provide, or provides other descriptive information. All label fields are of fixed size. A question on a survey form is an example of a text label field; the company logo is an example of a graphic label field.

The second main field type is the input field. This is an area on the form reserved for an item of data to be provided by the IP. An input field may be either of fixed length (e.g., phone number) or variable length (e.g., name). For a variable-length input field, the actual space reserved on the form would be the maximum length for a single line field (e.g., name) and the default length for a multiline field (e.g., the response to a question calling for descriptive information). Depending on the type of input required, input fields may be formatted as text fields, numeric fields, date fields, etc. An input field may have a variable number of subfields, such as the listing of sources of income on an income tax form. Also, it is possible to have a graphic input field, for example, to accommodate a diagram drawn by the IP or the IP's signature.

A third type of field is the computed (or derived) field. The value of a computed field is derived from computations using values obtained from other fields. The computations are performed automatically by the FMS.

When designing a form using the FMS (IC version), the designer assigns a distinct variable name to each field on the form. The FMS contains a list of reserved names for commonly used fields; these include, but are not necessarily limited to, the following: Name, FirstName, MI, LastName, Address, Address2 (the second line of the street address, if required), City, State, Zip, Country, HomePhone, WorkPhone, Fax, Email, Gender, DOB, and SSN.

In addition to the formatting information encoded in the FFB, the last row and last column of the FFB are reserved for error checking bits. If the white squares encode 0 bits and the black squares encode 1 bits, then each bit in last row set equal to the sum modulo 2 of all of the other bits in the corresponding column. Likewise, the error checking bits in the last column are set equal to the sum modulo 2 of all of the other bits in the corresponding rows. How errors are detected and, in some cases, corrected is discussed later.

In order for an IP to complete a form created by the FMS (IC version) using the FMS (IP version), he needs to have the FMS (IP version) installed on his computer, an optical scanner, and, of course, a printer. The IP version of the FMS could be made available as a free download from a web site or at nominal cost on a CD. The profit would be made from the sale of the IC version of the FMS.

2. Detailed Description of the Invention

Figure 5:
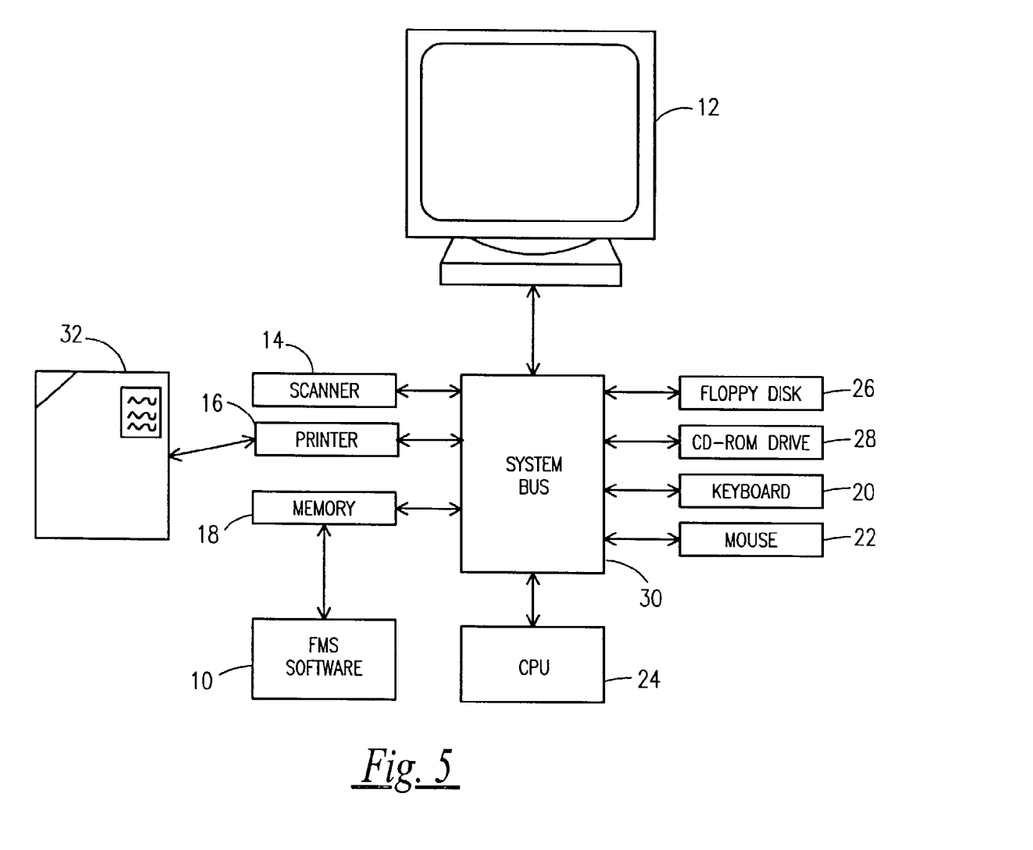
FIG. 5 is a block diagram of a form scanning and editing software system and the interaction of the apparatus with a standard computer system.

Referring now to FIG. 5, an implementation of the FMS 10 is shown, according to the present invention, in a block diagram. The FMS software 10 is incorporated into a standard computer system which includes a monitor 12, an optical scanner 14, a printer 16, a memory storage device 18, a keyboard 20, a mouse 22, a central processing unit 24, a floppy disk drive 26, a CD-ROM drive 28, and a system bus 30 interconnecting the aforementioned components. A form file 32 is an electronic version of the form designed and modified by the FMS 10.

Figure 6:
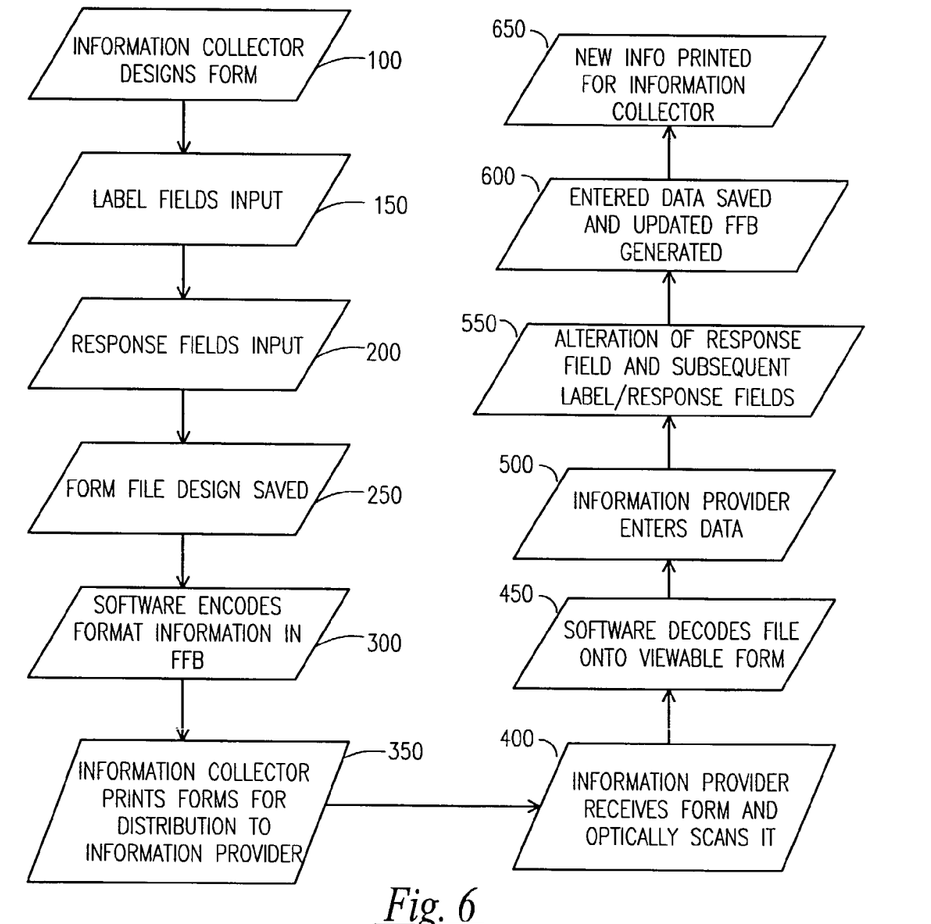
FIG. 6 is a flow diagram of the apparatus of FIG. 5, illustrating the creation, encoding, transmission, data input, and re-transmission of said form.
Figure 7A:
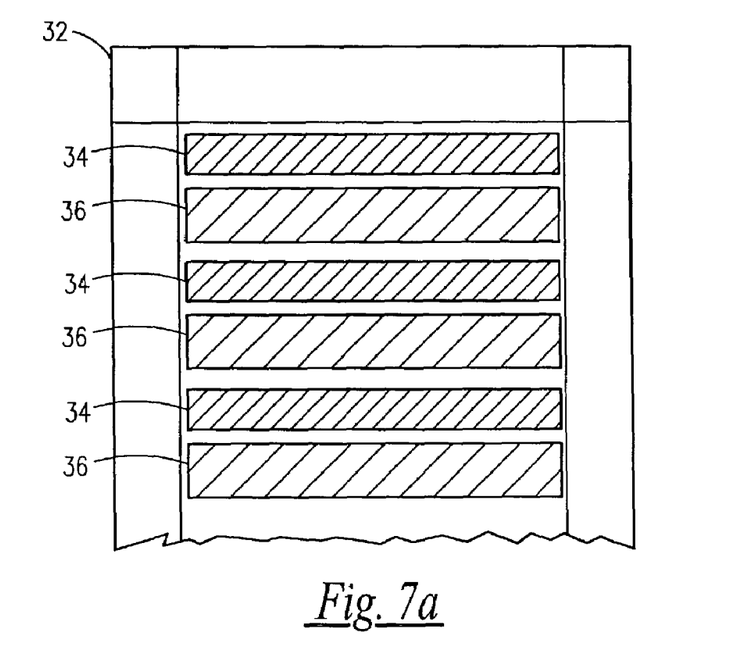
Figure 7B:
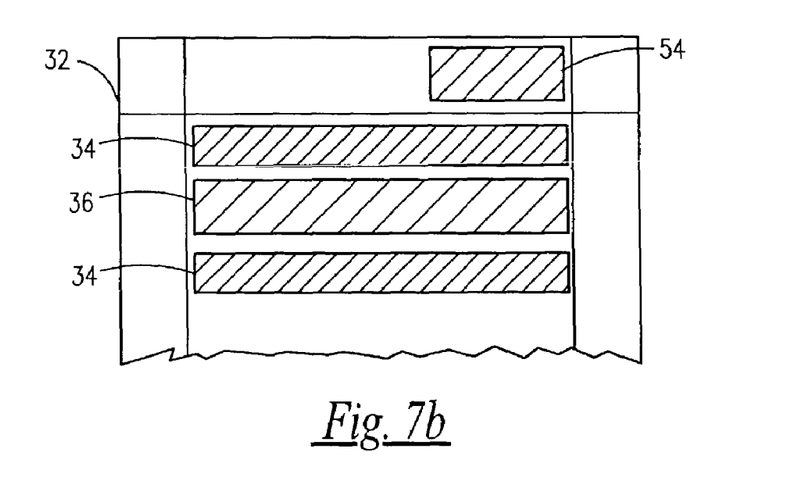
Figure 7C:
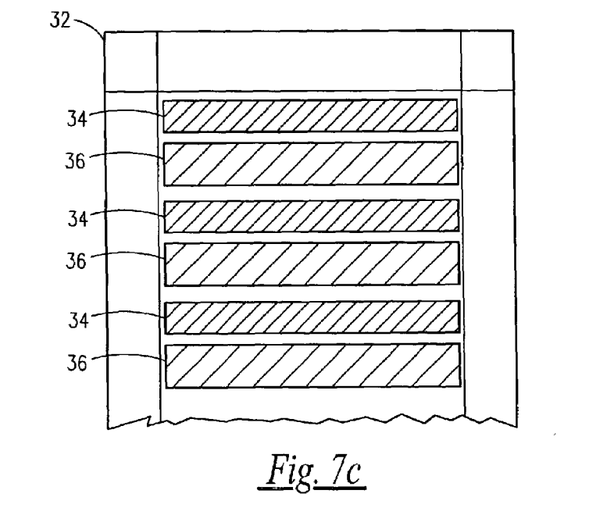
Figure 7D:
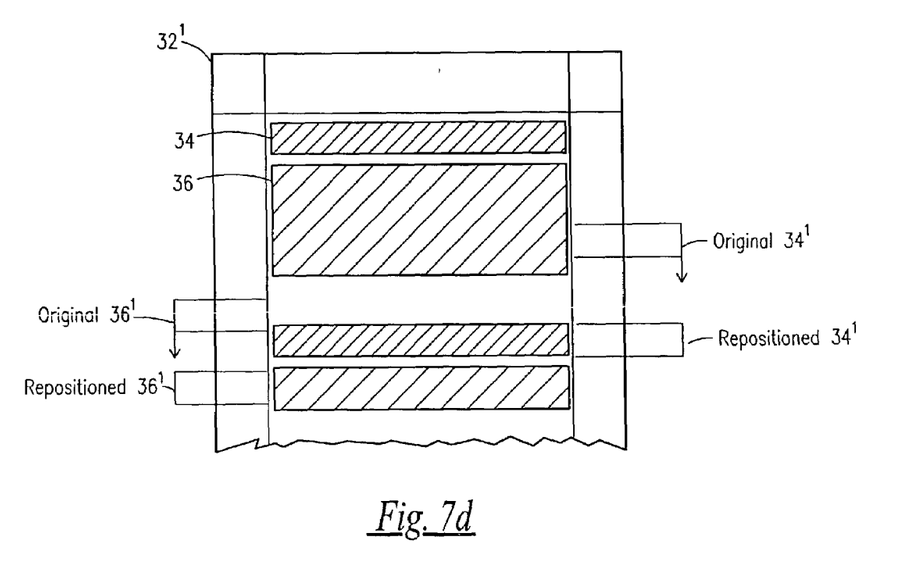

FIG. 6 is a flow diagram showing the processing of forms using the FMS 10. The steps of FIG. 6 are described in conjunction with FIG. 5. An information collector begins designing a desired form (step 100) by entering the data into a printed form. The information collector formats the label fields 34 (step 150) and the response fields 36 (step 200) via the keyboard 20 or mouse 22, and then transfers the information from the printed form to an electronic version by saving (step 250) the desired form file 32 either to the memory storage device 18 or a portable floppy disk in the disk drive 26. The FMS 10 generates a FFB 54 (step 300) from information in the form file, which is an encoded block of information (preferably located at the upper right portions of the form file 32) that retains the label and response field 34 and 36 formatting information. The information collector then prints a physical hard copy of the form file 32 (step 350) which contains the label and response fields 34 and 36 and the encoded FFB 54 (see FIG. 7-B). The hard copy of form file 32 (i.e., the printed "blank" form) is then received by the information provider for data input.

After receipt of the printed form 32 (containing the FFB 54—see FIG. 7-B), the information provider scans the form 54 (step 400) by an optical scanner 14. The FMS 10 decodes the FFB 54 (step 450), and presents the form file 32 as a viewable form on the monitor 12 capable of receiving data input (step 450). As the information provider inputs data (see step 500 of FIG. 6), the FMS 10 allows for the repositioning of the label fields 34 and the response fields 36 as necessary, and saves the modifications (step 550). After the information provider completes data input, the form file 32 is saved (step 600) and the FMS 10 converts the formatting information in the edited form file 32 into another FFB 54. The edited form file 32', and the updated FFB 54 may be printed by the information provider (see step 650 of FIG. 6) and sent to the information collector. The information collector can then use the optical scanner 14 to input the completed forms, and the FMS to decode the formatting information in the FFB, in order to view, analyze or further alter or edit the entered data. The collective process described above, in which the form is encoded and decoded, may be repeated as many times as necessary between an information collector and information provider.

Referring now to FIG. 7-A through FIG. 7-D, several detailed illustrations of the steps described by FIG. 6 are shown. FIG. 7-A illustrates a form file 32 with a plurality of label fields 34 and a plurality of response fields 36. A label field 34 contains a question or statement for which the information provider supplies a response, and is of a specified location on the form 38 (not shown), of a specified field length 40 (not shown), and with specifically assignable font sizes 42 and font types 44 (not shown) (see step 150 of FIG. 6). Correspondingly, a response field 36 is an area reserved for the information supplied by the information provider, and is of a specified location on the form 46 (not shown), and may be of a specified or open field length (allowing for responses of exceptional length) 48 (not shown), and with specifically assignable font sizes and font types 50 and 52 (not shown) (see step 200 of FIG. 6). The information collector then saves the form file 32 (see step 250 of FIG. 6) containing the FFB 54. The FMS 10 then converts the location and format of the label and response fields 34 and 36, respectively, into a FFB 54 (see FIG. 7-B), which is an optically scannable code.

FIG. 7-B illustrates the form file 32 as received by an information provider, which contains a FFB 54 storing the location and format information of the form file 32 as designed by the information collector. Upon receipt, the information provider scans the FFB 54, which triggers the FMS 10 to decode the FFB 52. The information decoded from the FFB 54 is converted into a viewable form file 32 (shown in FIG. 7-C) that is displayed on the monitor 12 (see FIG. 5 and step 450 of FIG. 6).

FIG. 7-C illustrates a form file 32 before data entry and is similar in appearance to FIG. 7-A. FIG. 7-D illustrates a form file 32' that is receiving data entry, in which the response field 36 is altered in size as an extended data entry is input. The alteration of the response field 36 causes a corresponding alteration to subsequent label fields 34' and response fields 36' (see step 550 of FIG. 6). After the information provider enters all required data, the completed form file 32' is saved (see step 600 of FIG. 6) and the FMS 10 generates another form field block 54 with the edited form. A hard copy of the edited form file 32 is printed by the information provider and returned to the information collector for viewing, analysis, alteration or editing. The information collector can then decode the form field block 54 by using the optical scanner 14, and thus review the data entered.

3. Operation of the Preferred Embodiment

Considering in some detail the process by which an IP fills out a form using the FMS (FIG. 2), the process begins when the IP launches the FMS. The FMS then directs the IP to scan the form. After the first page of the form is scanned, the FMS attempts to locate the FFB. The FFB may be slightly displaced from its designated position due to, for example, the page in the scanner not being precisely positioned. The FMS has the capability to make minor changes in the position, orientation, and magnification of the form image in order to restore the FFB to its designated position, orientation, and size; such a capability is common in software packages processing photographic images, and is thus prior art. If the FMS is unable to locate the FFB, it displays an error message to that effect and terminates.

Once the FMS has located and read the FFB, it performs an error check by testing whether the error check bits still equal the sums modulo 2 of the corresponding rows and columns. Possible sources of error are ink smudges and specks of dirt on the FFB. If a single bit is in error, it can be precisely located (and therefore corrected) by the row and column of the error check bits that correspond the check sums that are in error. (If the check sum for only a column, say, is in error, then the erroneous bit must be the error check bit.) If the FMS detects any such errors, it displays a message to the IP to that effect. If there is just a single error, the FMS corrects it and continues; multiple errors cause the FMS to terminate.

The FMS next extracts from the FFB the formatting information for the first field on the form. If that field is a label field, then the FMS will read the text (using its optical character recognition ability) from the location on the form image specified in the formatting information for that field. After the FMS has likewise processed the information for all of the fields on the form, it displays a screen image of the first page of the form. On that page, the label fields contain the text that was on the printed forms. The input fields are initially blank, and are filled in by the IP. The IP may use the tab key to move between successive input fields. The input fields may have editing checks, for example, to prevent non-numeric characters from being entered into a numeric field. Information entered on fields named (by the IC) using reserved variable names (e.g., FirstName) is automatically saved by the FMS for use in filling out future forms. The IP can also specify values for the reserved variables before using the FMS to fill out forms. In either case, if a reserved variable has been assigned a value (e.g., Gender=M), then that assigned value appears as the default value whenever the corresponding field is specified on a form. This feature of the FMS relieves the IP of the burden of entering the same information on each form. Computed fields remain blank until all of the fields from which they are derived are filled in. If the IP tabs over to a graphic input field, a set of drawing tools will be made available.

The FMS allows the IP to save completed or partially completed forms as files, so that they can be later edited or printed. When a completed form is printed, the information provided by the IP appears on the form in the appropriate places. In addition, the information in the FFB is modified as follows. First, a bit switch is set to indicate that the form was prepared using the FMS. For variable length multiline fields, the actual field length (i.e., the length of the IP's input) is encoded in the FFB. Additionally, the positions of fields following variable length multiline fields may need to be adjusted. Finally the new error check sums are computed and encoded into the error checking bits.

Figure 3:
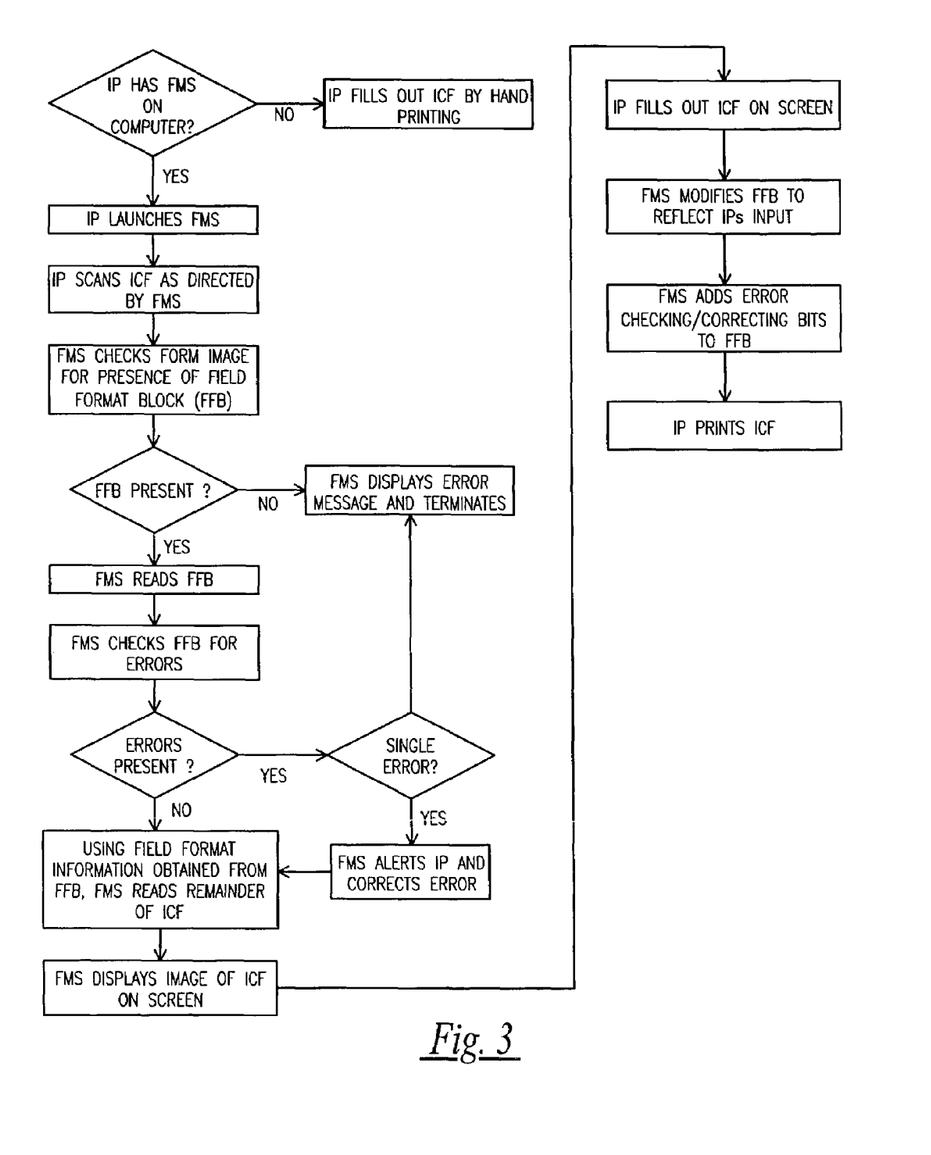
FIG. 3 is a flow diagram for the process by which the IP provides the information requested on the forms.
Figure 4:
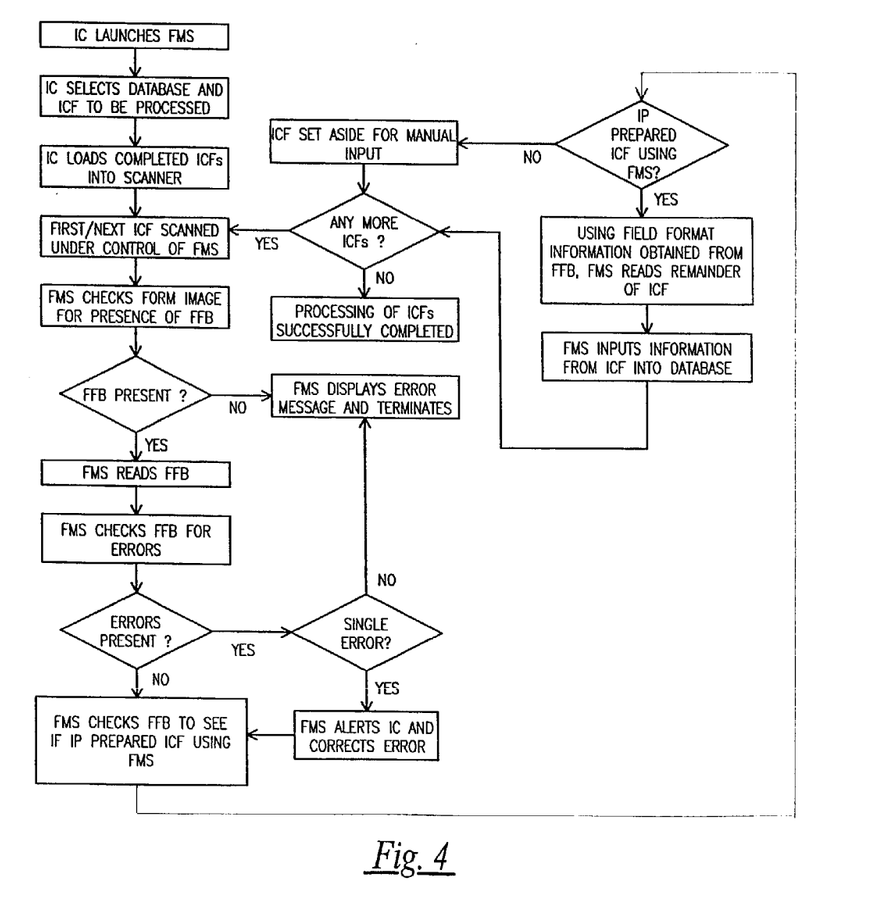
FIG. 4 is a flow diagram for processing of data-populated forms by the IC.

Once the IP has completed the form, either by using the FMS or by hand printing, he mails or faxes it to the IC. The IC may wait to receive all of the forms, or, alternatively, process the forms singly or in batches. FIG. 3 shows the steps required for the FMS to process these forms.

When the IC is ready to process the completed forms, he launches the FMS (IC version). The FMS then directs the IC to load the completed forms into the optical scanner. The FMS directs the scanner to scan the first page of the first form. The FMS then attempts to locate the FFB in the upper right corner of the screen image, if necessary making minor adjustments in the position, orientation, and magnification of the image in order to make the FFB appear in its designated location. If the FMS is unable to locate the FFB, it displays a message to that effect and terminates. If the FMS locates the FFB, it then performs an error check; as previously mentioned, the FMS can correct an error in a single bit, but is forced to terminate if more than one bit is in error. If the FFB passes the error check, the FMS next checks the bit in the FFB that indicates if the form was prepared using the FMS. Those forms that were filled out by hand printing are set aside for manual input into the database. If the form being processed was filled out using the FMS, then the FMS obtains the formatting information for each field from the FFB and uses that information to locate on the form and read the content of each field and input that information into the database. If the FFB indicates that there are additional pages to the form, then the FMS processes the fields on these additional pages similarly. Once the FMS has processed the first form, it checks to see if there are any additional forms, and continues until all of the forms are similarly processed.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A method for transmitting information necessary to create an electronic form, said method comprising the step:
    a. Entering data to a printed form;
    b. Transferring said data from said printed for to an electronic form;
    c. Generating a field format block containing the location and field type for any transferred electronic data;
    d. Creation of a graphically coded indicia containing all information generated in creating said field format block; and
    e. Placing of said indicia onto said printed form.

2. The method of claim 1, further comprising the steps:
    a. Identifying said indicia;
    b. Decoding all information coded within said field format block;
    c. Identifying said field type and field location for respective data on said printed form; and
    d. Generating a data entry form utilizing said data and said field type and said field location.

* * * * *